Feb. 3, 1959 H. SERNETZ 2,872,024
VIBRATORY MACHINE
Filed June 4, 1953
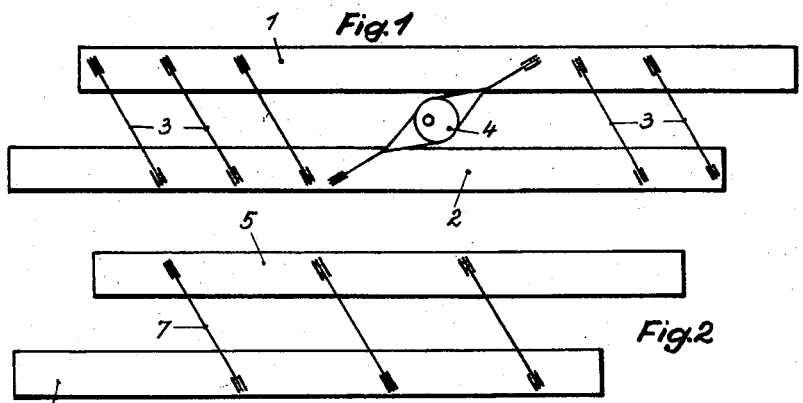
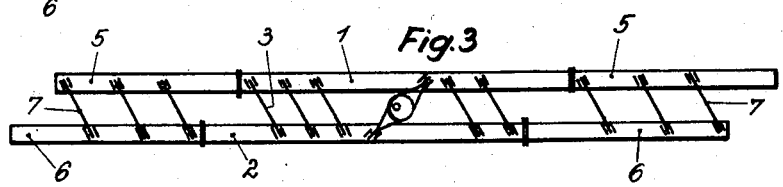
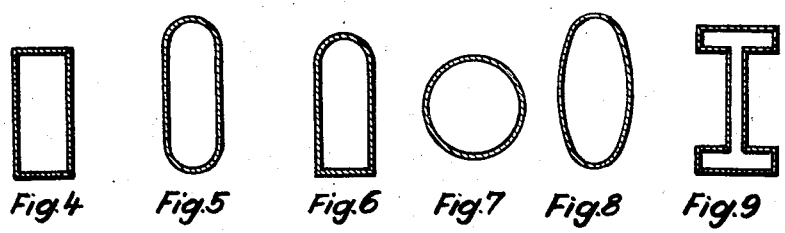
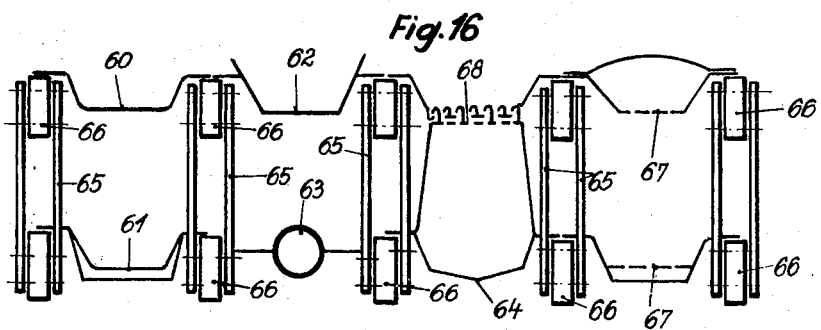
Inventor: HEINZ SERNETZ
by A. John Michel
Attorney.

Feb. 3, 1959  H. SERNETZ  2,872,024
VIBRATORY MACHINE
Filed June 4, 1953  2 Sheets-Sheet 2
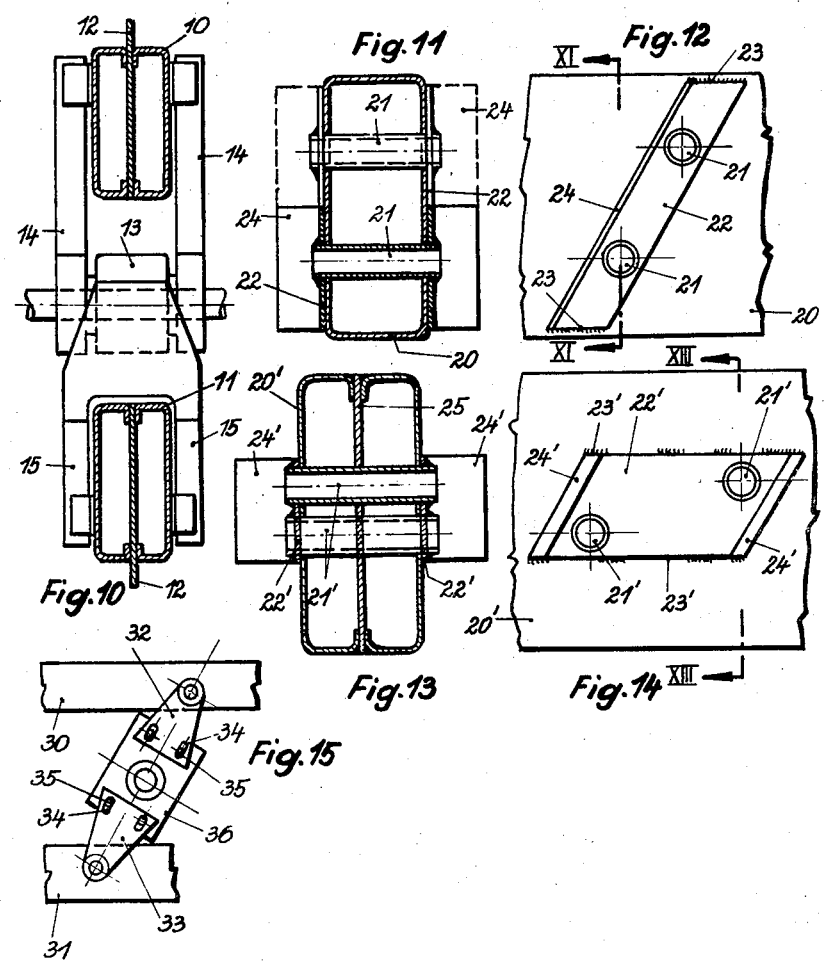
Inventor: HEINZ SERNETZ
by A. John Michel
Attorney.

United States Patent Office 2,872,024
Patented Feb. 3, 1959

2,872,024

VIBRATORY MACHINE

Heinz Sernetz, Graz, Austria

Application June 4, 1953, Serial No. 359,555

6 Claims. (Cl. 198—220)

This invention relates to machines of the vibratory type, in particular conveyor and sifting machines, of the known kind which consist of two members which receive the material to be treated and which vibrate in opposition to one another and are connected by springs and which derive their driving movement from a common driving means. The conveyor channels or sieves which receive the material to be treated are generally superimposed and are often coupled by links in addition to the said springs. The driving movements are derived from suitable vibratory members, for example push rods, which are driven by eccentrics or cranks.

The object of the invention is to increase the conveying length of such machines considerably with the aid of economical means. The limitation on the conveyor path of such machines previously meant that conveyor members of greater length give rise to nodes of vibration by reason of bending, which disturb the conveyor action. Also it is not possible to transmit the impulses effecting the conveying via conveyor members of great length in the appropriate manner. The invention solves the problem in that each lateral carrier of the one vibratory member is constructed, with the lateral carrier, associated vertically with it, of the other oscillatory member, as a single oscillatory unit by means of a cross-sectional shape which affords stiffening against bending and also by symmetrical arrangement of the springs connecting them. The said lateral carries are likewise elements of the vibratory member which for example may be a channel or sieve; it is only intended that these lateral carriers shall be constructed in the particular way referred to. The invention makes it possible for the hitherto customary individual forming of these machines to be replaced by rational, i. e. mass production of the individual parts, since the machine according to the invention is constructed from individual parts which can be assembled into machines of very different operating characteristics. The mode of construction according to the invention of vibratory machines enables the driving means, with parts of the two vibratory members, to be formed into a vibratory main machine part serving as the driving device and known in itself, but of increased rigidity and stiffness, to which main machine part vibratory components likewise formed in accordance with the invention can be connected according to a box-like system of construction. These components preferably derive their drive from the driving means of the main part. Thus it is possible to obtain machines corresponding to the requirements of particular cases by a combination of different members and arrangements of the components, whereby the output of the driving machine is suited to these requirements.

Practical forms of the invention are illustrated in the accompanying drawing, in which Fig. 1 shows a driving arrangement in side view,
Fig. 2 shows a constructional part,
Fig. 3 shows a machine made up to these parts, Figs. 4 to 9 illustrate different cross-sectional forms of lateral carriers of the vibratory members, Fig. 10 shows an example of the construction of the driving means, Figs. 11, 12 and 13, 14 show the mode of securing the springs to the vibratory members, Fig. 15 shows a link connecting these members, and Fig. 16 shows an example of a vibratory machine according to the invention.

In Fig. 1, 1 is the upper and 2 the lower swinging member, 3 are leaf springs connecting these members, and 4 is a driving means, for example an eccentric drive. Fig. 2 shows a constructional part having the upper and lower vibratory members 5 and 6 respectively and the connecting springs 7. Fig. 3 shows, on a smaller scale, how the main part, Fig. 1, is combined with two parts according to Fig. 2. Since by combining the units of Figs. 1 and 2 vibratory machines of considerable length can be constructed, and the whole of the driving power will be transmitted practically up to the ends of the machine by the vibratory members 1, 2 or 5, 6, there is required a particularly stiff construction of the vibratory members, which however must be of the smallest possible weight and free from undesired resonances. These requirements are best met by a hollow or box-like profile. In order to ensure that the springs remain as free as possible from torsion and other undesired effects, it is recommended that the box profile be given a plane of symmetry which is also the plane of symmetry of the spring arrangement.

Figs. 4 to 9 show such a profile diagrammatically, whilst Fig. 10 illustrates, in vertical section through two superimposed carriers of the vibratory members, the symmetrical connection of the driving members. In Fig. 10, numerals 10 and 11 each indicate a lateral carrier, of rectangular box profile, for the vibratory members, which are further strengthened by an intermediate stiffening rib 12 arranged in the plane of symmetry. 13 is an eccentric which, via symmetrically distributed pushrods 14, 15 transmits the driving forces to the vibratory members, as is illustrated in principle in Fig. 1. In this way both swinging masses can be extended to a double-mass swinging system. It is desirable to drive such a system positively and to mount it at the nodes of the operating springs, for which purpose links are provided which support the whole system and thereby statically relieve the springs, as will be explained hereinafter.

It has been found that all those forces should be kept away from the springs connecting the two swinging members, as do not lie in the plane determined by the elastic line of the springs. In order to fulfill this requirement each box-like carrier is provided on both sides with springs which are arranged symmetrically with respect to its plane of symmetry. For transmitting the forces from the springs to the vibratory members or vice versa, use is made of bridge members which pass through these swinging members. Examples of this mode of connection are shown in Figs. 11, 12, and 13, 14 in section and in side view (according to the relative section lines). The box-like carrier 20 (Figs. 11, 12) is penetrated by two tubes 21, which have welded to them flange portions 22 which contact, over a large area, the side walls of the carriers 20 and are connected therewith by a plurality of horizontal weld seams 23. This arrangement has proved very effective in practice. The springs (not shown) engage flanges 24, which project from the plate 22. The construction according to Figs. 13 and 14 is basically the same, but the flanged plate 22' is of a different shape and a strengthening bridge 25 is provided within the carrier 20'. Those parts of Figs. 13, 14 which correspond to parts of Figs.

11, 12 have the same reference numerals, provided with indices.

For the suppression of vibrations which are due to forces which act externally to the plane formed by the elastic line of the springs and thereby make undesired demands on the connecting springs, it is also important that the suspension of the whole vibratory system, via which the latter rests on the ground or base, is such that the suspension points remain free from vibrations, since these vibrations which are transmitted to the ground, adversely affect the life of the machine. The mounting must therefore be constructed so that the suspension points remain at rest during running of the machine; this is the case if the suspension points and the centre of vibration lie in one plane. This requirement must be fulfilled exactly, otherwise the advantages gained from the box-like construction of the lateral carriers are again lost. In accordance with the invention the links connecting the two associated oscillatory members in addition to the springs, and affording the supporting points of the machine as regards its carrying frame, are constructed as at least two-part members which are fixed against angular movement, but are resilient longitudinally. An example of this is shown in Fig. 15, in which can be seen the two vibratory members 30, 31 and the flaps 32, 33 which are linked to them and which are connected via pins 35 in elongated slots 34 with the member 36, by which the machine rests on the ground. This construction ensures that the axis of the part 36 can, so to say, be centred at a node of oscillation.

Figure 16 shows an example of a combined machine with a plurality of adjacent units; the latter may be combinations analogous to Figure 3. The carriers 66 which are connected by springs 65 are common to the conveyor channels 60 to 67 which serve different conveyor purposes and are accordingly constructed differently (the tubular channels 63 serving for example as a drying device). The channels 67 may be sifting channels, but may naturally also be of other kinds employed in the present technique. The length of the individual channels need not be entirely equal. The driving means may be common to some channels and for this purpose continuous eccentric or cranked axles (not illustrated) may be employed. The sifting device 68 is engaged by lugs on the more deeply disposed vibratory member 64 and is thereby preserved from displacements.

What I claim is:

1. A resilient support means for two superposed vibratory members, comprising in combination: two rigid lateral carriers supporting each of said vibratory members, the lateral carriers of the upper and lower ones of said vibratory members being vertically aligned with each other, and two resilient elements symmetrically arranged at each side of each two vertically aligned lateral carriers and connecting the same whereby each of two vertically aligned carriers with their two resilient connecting elements form a single oscillatory unit.

2. The resilient support means of claim 1, wherein said resilient elements are leaf springs.

3. The resilient support means of claim 1, wherein said lateral carriers are hollow profiles.

4. The resilient support means of claim 1, wherein said lateral carriers are hollow profiles and a stiffening rib is mounted in said profiles in their plane of symmetry.

5. A resilient support means for two superposed vibratory members, comprising in combination: two rigid, hollow lateral carriers having side walls and supporting each of said vibratory members, the lateral carriers of the upper and lower ones of said vibratory members being vertically aligned with each other, transverse elements having flange portions mounted in said side walls with the flange portions contacting the outside of the side walls and being fixedly connected thereto, and two resilient elements symmetrically arranged at each side of each two vertically aligned lateral carriers and connecting the same, and support means for fixedly connecting said resilient elements to said flange portions whereby each two vertically aligned carriers with their two resilient connecting elements form a single oscillatory unit.

6. A resilient support means for at least three laterally adjacent pairs of superposed vibratory members, comprising in combination: two rigid lateral carriers supporting each of said vibratory members, each two laterally adjacent vibratory members sharing a single lateral carrier, the lateral carriers of the upper and lower ones of said vibratory members being vertically aligned with each other, and two resilient elements symmetrically arranged at each side of each two vertically aligned lateral carriers and connecting the same whereby each two vertically aligned carriers with their two resilient connecting elements form a single oscillatory unit.

References Cited in the file of this patent

UNITED STATES PATENTS

| 2,171,540 | Calkins et al. | Sept. 5, 1939 |
| 2,378,499 | Rapp | June 19, 1945 |
| 2,705,070 | Carrier et al. | Mar. 29, 1955 |
| 2,713,415 | Wurzback | July 19, 1955 |
| 2,725,984 | Klemencic | Dec. 6, 1955 |

FOREIGN PATENTS

| 510,532 | Great Britain | Aug. 2, 1939 |